United States Patent [19]

Uehara

[11] 4,306,488

[45] Dec. 22, 1981

[54] PRESSURE-COMPENSATED DIRECTIONAL CONTROL VALVE

[75] Inventor: Kazuo Uehara, Tokyo, Japan

[73] Assignee: Kabushiki Kaisha Komatsu Seisakusho, Tokyo, Japan

[21] Appl. No.: 104,753

[22] Filed: Dec. 18, 1979

[30] Foreign Application Priority Data

Dec. 21, 1978 [JP] Japan .................. 53-156925

[51] Int. Cl.³ .................. F15B 13/06; F15B 13/09
[52] U.S. Cl. .................. 91/31; 91/516; 91/517; 91/518; 137/596.13
[58] Field of Search .................. 91/31, 516, 517, 518; 137/596.13

[56] References Cited

U.S. PATENT DOCUMENTS 3,455,210 7/1969 Allen .

FOREIGN PATENT DOCUMENTS 53-85023 7/1978 Japan .

*Primary Examiner*—Gerald A. Michalsky
*Attorney, Agent, or Firm*—Armstrong, Nikaido, Marmelstein & Kubovcik

[57] ABSTRACT

A pressure-compensated directional control valve assembly suitable for use in hydraulic power steering systems of off-highway working vehicles. The valve assembly integrally comprises a control valve for controlling communication between two engine-driven pumps and a steering cylinder, and a pressure compensator valve for controlling the fluid pressure delivered from the pumps to the control valve. Constantly comparing its outgoing fluid pressure with the fluid pressure at control ports of the control valve, the pressure compensator valve delivers to the control valve the pressurized fluid from one or both of the pumps. Any excess of the pressurized fluid is directed from the pressure compensator valve to, for example, an implement hoist cylinder of the work vehicle.

5 Claims, 1 Drawing Figure

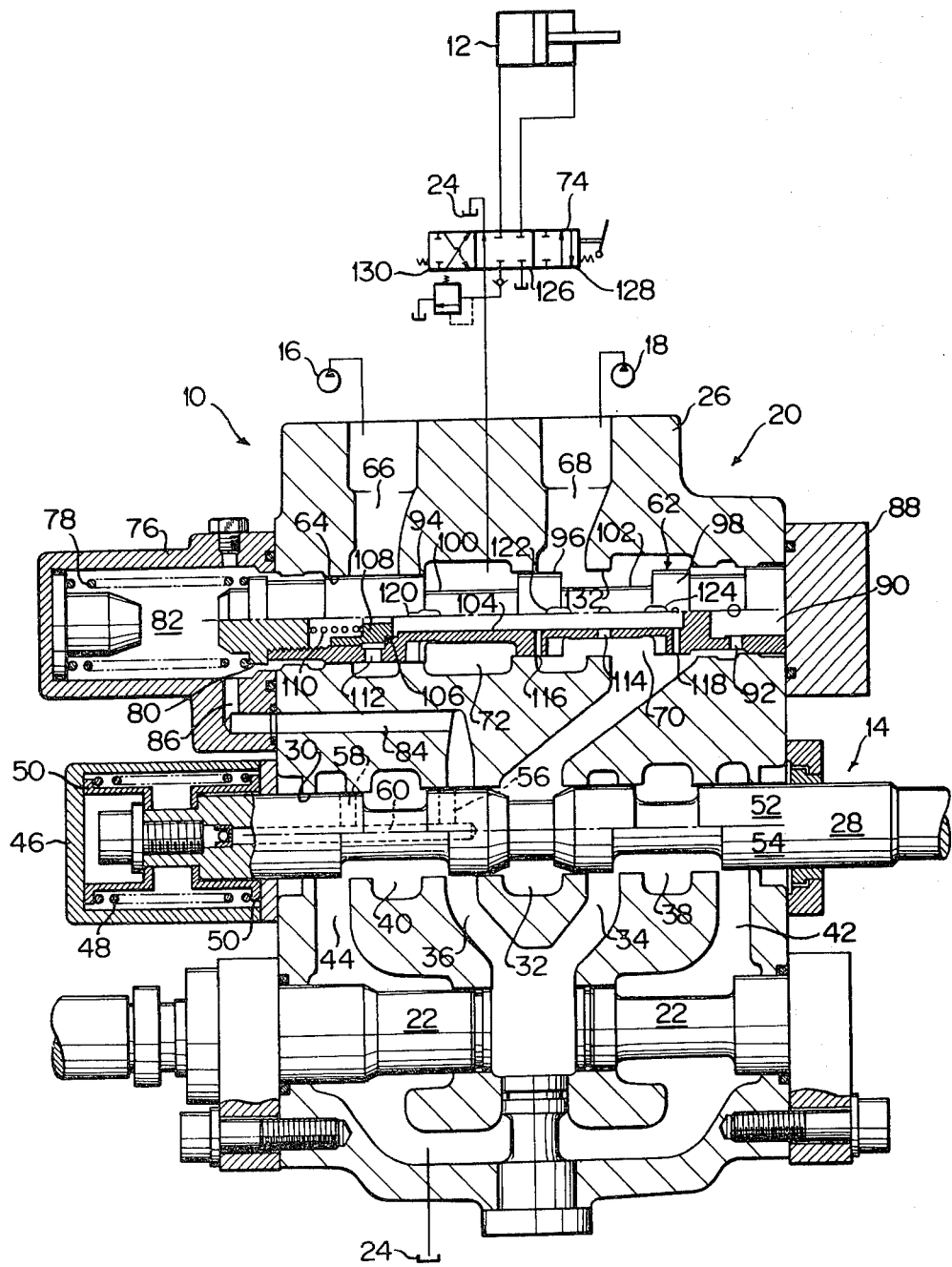

PRESSURE-COMPENSATED DIRECTIONAL CONTROL VALVE

BACKGROUND OF THE INVENTION

1. Field of the Invention

This invention relates generally to valves and specifically to a pressure-compensated directional control valve assembly. The valve assembly according to the invention is particularly well adaptable for use as a hydraulic power steering valve in some off-highway work machines.

2. Description of the Prior Art

The control valves for hydraulic power steering systems have been known and used extensively which essentially are combinations of a directional control valve and a flow control valve or of a directional control valve and a flow divider. These control valves tend to invite great energy loss at high engine speed and to give rise to hunting through an increase in steering load pressure. A pressure-compensated directional control valve has also been suggested for use in a hydraulic power steering system, but it also is subject to considerable energy loss at high engine speed.

The hydraulic steering control valve in some off-highway working vehicles is desired to deliver pressurized fluid not only to the steering cylinder but also to an additional actuator such as an implement hoist cylinder. This is desirable because the steering cylinder need not demand the fluid pressure at all times during the operation of the work vehicle. The designing of such a control valve requires special consideration because the available pump pressure and delivery is subject to change with engine speed and because the additional actuator also makes a variable demand on the pump pressure.

SUMMARY OF THE INVENTION

It is therefore the primary object of this invention to provide an improved pressure-compensated directional control valve assembly which is of particular utility when incorporated in hydraulic power steering systems of work vehicles, among other applications.

Another object of the invention is to provide such a control valve assembly which minimizes energy loss, especially when high pump pressure is being developed.

A further object of the invention is to provide such a control valve assembly which delivers pressurized fluid to a first actuator at a controlled rate and which delivers any excess fluid to a second actuator, thereby making wasteless use of the available pump pressure.

Briefly summarized, the pressure-compensated directional control valve assembly according to this invention is essentially a combination of a control valve and a pressure compensator valve sharing one and the same housing. The control valve has an inlet port, a pair of actuator ports, a pair of control ports, and a pair of reservoir ports, all communicating with a first bore formed in the housing. Reciprocally mounted in the first bore, a control spool operates in a neutral position to block communications between the inlet port and all the other ports and to permit communication between the control ports and at least one of the reservoir ports. Upon movement from the neutral position the control spool permits communication between the inlet port and either of the actuator ports by way of the control ports.

The pressure compensator valve has a first pump port for receiving pressurized fluid from a first pump, a second pump port for receiving pressurized fluid from a second pump, a first outlet port in constant communication with the inlet port of the control valve, and a second outlet port, all communicating with a second bore in the housing. A pressure compensator spool reciprocally mounted in the second bore operates in a normal position to place the first and the second pump ports in communication with the first outlet port and out of communication with the second outlet port. Upon movement in a predetermined direction from the normal position the pressure compensator spool first permits communication between the first pump port and the second outlet port and then permits communication between the second pump port and the second outlet port. The movement of the pressure compensator spool in the predetermined direction from the normal position takes place when the fluid pressure at the first outlet port is higher than the resultant of the fluid pressure at the control ports of the control valve and the force of resilient means normally holding the pressure compensator spool in the normal position.

In a preferred embodiment, in which the control valve assembly is adapted for use in a hydraulic power steering system of a work vehicle, the pair of actuator ports of the control valve communicate with a steering cylinder for driving same. The second outlet port of the pressure compensator valve is adapted to be selectively placed in communication with an implement hoist cylinder and with a fluid drain by an additional directional control valve. Thus, when the outgoing fluid pressure of the pressure compensator valve is higher than the pressure demand by the steering control valve, the pressure compensator valve directs the pressurized fluid from one or both of the pumps to the hoist cylinder or to the drain.

The above and other objects, features and advantages of this invention and the manner of attaining them will become more apparent, and the invention itself will best be understood, from the following description of the preferred embodiment which is to be read in connection with the accompanying drawing.

BRIEF DESCRIPTION OF THE DRAWING

The accompanying drawing is a sectional view, partly in elevation, of a preferred form of the pressure-compensated directional control valve assembly in accordance with the invention.

DESCRIPTION OF THE PREFERRED EMBODIMENT

The reference numeral 10 in the drawing generally designates the pressure-compensated directional control valve assembly as adapted for use in a hydraulic power steering system of a work machine or vehicle. The work machine is assumed to be of the type having a hydraulic, double-acting implement hoist cylinder 12.

Broadly the pressure-compensated directional control valve assembly 10 comprises a control valve 14 for controlling fluid pressure communication between two engine-driven pumps 16 and 18 and a steering cylinder (not shown), a pressure compensator valve 20 interposed between the control valve 14 and the pumps 16 and 18 for the delivery of controlled pressurized fluid from the latter to the former, and relief valve means 22 for protecting the control valve 14 from excessive fluid pressure. All the mentioned valves 14, 20 and 22 share a common housing 26.

The control valve 14 includes an operator-actuated control spool 28 reciprocally mounted in a bore 30 formed in the housing 26. The bore 30 communicates with the following ports of the control valve 14:

(1) An inlet or pump port 32 in communication with the pumps 16 and 18 via the pressure compensator valve 20;
(2) A pair of control ports 34 and 36 in constant communication with each other;
(3) A pair of steering cylinder or actuator ports (A-port and B-port) 38 and 40 in constant communication with the unshown steering cylinder; and
(4) A pair of reservoir or tank ports 42 and 44 in constant communication with a reservoir 24.

The left hand end of the control spool 28 projects into a spring housing 46 accommodating a coiled compression spring 48. This spring extends between a pair of spring retainers 50 operatively engaged with the control spool 28. Thus normally held centered within the bore 30, the control spool 28 can be actuated either to the right or to the left against the force of the centering spring 48.

In order to facilitate illustration the upper half 52 of the control spool 28 is shown in a configuration for the use of the control valve 14 as a closed center valve. The lower half 54 of the control spool 28 is shown in a geometry for ABR port connection, meaning that when the control spool is in neutral, the A and B steering cylinder ports 38 and 40 are out of communication with the inlet port 32 but in communication with the reservoir ports 42 and 44, besides being in communication with the control ports 34 and 36.

Regardless of its configurations 52 and 54 the control spool 28 must hold the control ports 34 and 36 in communication with either or both of the reservoir ports 42 and 44 for the successful operation of this pressure-compensated directional control valve assembly 10. To this end the control spool 28 of the closed center configuration 52 has formed therein two radial passages 56 and 58 and an axial passage 60 bypassing the steering cylinder port 40. The control ports 34 and 36 thus communicate with the reservoir port 44 by way of the passages 56, 58 and 60 even when the control spool 28 of the closed center configuration 52 is in neutral.

The pressure compensator valve 20 has a fluid-actuated pressure compensator spool 62 reciprocally mounted in a bore 64 formed in the housing 26. The bore 64 communicates with the following ports of the pressure compensator valve 20:

(1) A first pump port 66 in constant communication with the first engine-driven pump 16;
(2) A second pump port 68 in constant communication with the second engine-driven pump 18;
(3) An outlet port 70 in constant communication with the inlet port 32 of the control valve 14; and
(4) Another outlet port 72 which can be selectively placed in communication with the implement hoist cylinder 12 and with the reservoir 24 by a three-position directional control valve 74.

The second mentioned outlet port 72 will hereinafter be referred to as the hoist cylinder port in contradistinction to the first recited outlet port 70.

The left hand end of the pressure compensator spool 62 intrudes into a spring housing 76. Received in this housing 76 is a coiled compression spring 78 acting on a spring retainer 80 on the pressure compensator spool 62 for biasing same rightwardly. The spring housing 76 also serves to define a fluid chamber 82 for receiving control fluid pressure from the control port 36 of the control valve 14 by way of a passage 84 in the housing 26 and a passage 86 in the housing 76. Normally the biasing spring 78 holds the pressure compensator spool 62 in the extreme right hand position, as shown, with the spool abutting against a cap member 88 closing the bore 64.

The right hand end of the pressure compensator spool 62 is formed into a fluid chamber 90 open to the cap member 88. This fluid chamber communicates with the outlet port 70 by way of a radial passage 92 formed in the pressure compensator spool 62. The pressure compensator spool 62 travels leftwardly when the fluid pressure of its right hand fluid chamber 90, and therefore of the outlet port 70, overcomes the resultant of the force of the biasing spring 78 and the fluid pressure of the left hand fluid chamber 82.

The pressure compensator spool 62 carries the following lands and grooves:

(1) A first land 94 normally blocking communication between first pump port 66 and hoist cylinder port 72;
(2) A second land 96 normally holding the second pump port 68 in communication with the outlet port 70 and out of communication with the hoist cylinder port 72;
(3) A third land 98 for constricting the path from the second pump port 68 to the outlet port 70 upon leftward movement of the pressure compensator spool 62;
(4) A first annular groove 100 between first land 94 and second land 96; and
(5) A second annular groove 102 between second land 96 and third land 98.

Further the pressure compensator spool 62 has a passage 104 formed axially therein. The left hand end of the axial passage 104 is formed into an annular valve seat 106, against which is urged a hollow, stepped check valve 108 under the bias of a coiled compression spring 110. The check valve 108 controls communication between the axial passage 104 and a radial passage 112 formed in the pressure compensator spool 62. The radial passage 112 is open to the first pump port 66 when the pressure compensator spool 62 is in the illustrated normal position.

Normally, therefore, the pressurized fluid from the first pump 16 enters the axial passage 104 from the radial passage 112 by opening the check valve 108 against the bias of the compression spring 110. The pressurized fluid subsequently flows out of the axial passage 104 through another radial passage 114 open to the outlet port 70.

The pressure compensator spool 62 has further formed therein two small-diameter passages 116 and 118 and three slots 120, 122 and 124. As will be understood from the subsequent description of operation, the pressurized fluid flowing from the first pump port 66 to the hoist cylinder port 72 gives rise to no great flow force. This embodiment employs no particular measure against such flow force, other than the control of the cross-sectional area of the flow path by the first annular groove 100 together with the slot 120.

Considerable flow forces can develop, however, as the pressurized fluid flows from second pump port 68 to the hoist cylinder port 72 and through the constricted path from the second pump port 68 to the outlet port 70.

The small-diameter passages 116 and 118 in the pressure compensator spool 62 are intended to impart high flow forces to the fluid following such paths. The second annular groove 102 together with the slots 122 and 124 is intended to permit the passage of the fluid without pressure drop.

The hoist control valve 74 between the hoist cylinder port 72 of the pressure compensator valve 20 and the implement hoist cylinder 12 is a six-port, three-position valve, having a neutral position 126, a right hand offset position 128, and a left hand offset position 130. The hoist control valve 74 when in the neutral position 126 places the hoist cylinder port 72 out of communication with the implement hoist cylinder 12 and, instead, in communication with the reservoir 24. When actuated to the right hand position 128 or to the left hand position 130, the hoist control valve 74 permits delivery of the pressurized fluid from the hoist cylinder port 72 to the head end or rod end chamber of the implement hoist cylinder 12.

OPERATION

During the operation of the work machine incorporating the pressure-compensated directional control valve assembly 10, the first and the second pumps 16 and 18 constantly deliver pressurized fluid, normally hydraulic oil, to the first and the second pump ports 66 and 68, respectively, of the pressure compensator valve 20. Let it be assumed that the pressure compensator spool 62 is now in the illustrated extreme right hand position under the bias of the compression spring 78.

Although the first pump port 66 of the pressure compensator valve 20 is then closed by the first land 94 on its spool 62, the pressurized fluid from the first pump 16 opens the check valve 108 within the spool against the bias of the compression spring 110. Thus admitted into the axial passage 104 in the pressure compensator spool 62, the pressurized fluid flows on to the outlet port 70 through the radial passage 114 in the spool. The pressurized fluid from the second pump 18, on the other hand, flows from the second pump port 68 to the outlet port 70 through the second annular groove 102 in the pressure compensator spool 62.

The pressurized fluid from the first and the second pumps 16 and 18 flows from the outlet port 70 to the inlet port 32 of the control valve 14 on the one hand and, on the other hand, into the right hand fluid chamber 90 of the pressure compensator valve 20 through the radial passage 92 in its spool 62. The left hand fluid chamber 82 of the pressure compensator valve 20 receives fluid pressure from the control port 36 of the control valve 14.

The pressure compensator spool 62 starts traveling on its leftward stroke if the fluid pressure in the right hand chamber 90 of the pressure compensator valve 20 defeats the resultant of the force of the biasing spring 78 and the fluid pressure in the left hand chamber 82. The leftward travel of the pressure compensator spool 62 continues until, first of all, its first land 94 uncovers the first pump port 66. Thereupon the pressurized fluid from the first pump 16 flows from the first pump port 66 to the hoist cylinder port 72 through the first annular groove 100 in the pressure compensator spool 62, instead of flowing to the outlet port 70 through the pressure compensator spool axial passage 104. The fluid pressure of the pressure compensator valve outlet port 70 thus decreases.

The decreased outgoing fluid pressure of the pressure compensator valve 20 may be still higher than the resultant of the force of the biasing spring 78 and the fluid pressure in the left hand chamber 82. Then the pressure compensator spool 62 continues its leftward motion until, secondly, its second land 96 opens the path from the second pump port 68 to the hoist cylinder port 72. Thereupon the pressurized fluid from the second pump 18 flows partly to the hoist cylinder port 72, thereby further decreasing the outgoing fluid pressure of the pressure compensator valve 20.

The pressurized fluid directed into the hoist cylinder port 72, first from the first pump 16 and then from the second pump 18, will return to the reservoir 24 via the hoist control valve 74 if this valve is in neutral. The pressurized fluid will flow from the hoist cylinder port 72 to the implement hoist cylinder 12 if the hoist control valve 74 is actuated in either direction. In this latter case a high fluid pressure will build up in the hoist cylinder port 72, correspondingly increasing the fluid pressure at the pressure compensator valve outlet port 70.

Then the leftward travel of the pressure compensator spool 62 further continues until, finally, its third land 98 starts gradually constricting the direct path from the second pump port 68 to the outlet port 70 by approaching a land 132 on the valve housing 26. The outgoing fluid pressure of the pressure compensator valve 20 thus decreases until an equilibrium occurs between the fluid pressure in its right hand chamber 90 and the resultant of the spring force and fluid pressure in the left hand chamber 82.

The pressure compensator spool 62 starts traveling rightwardly when the fluid pressure in the right hand chamber 90 grows less than the resultant of the spring force and fluid pressure in the left hand chamber 82. The following functional steps take place, in the order of numbering, during the rightward return stroke of the pressure compensator spool 62:

(1) The third land 98 cancels the constriction of the direct path from the second pump port 68 to the outlet port 70.
(2) The second land 96 blocks communication between second pump port 68 and hoist cylinder port 72, causing the pressurized fluid from the second pump 18 to flow wholly to the outlet port 70.
(3) The first land 94 blocks communication between first pump port 66 and hoist cylinder port 72, causing the pressurized fluid from the first pump 16 to flow to the outlet port 70.

Thus the outgoing fluid pressure of the pressure compensator valve 20 increases with the rightward return motion of the spool 62.

The outlet port 70 of the pressure compensator valve 20 is in constant communication with the inlet port 32 of the control valve 14. As will have been understood from the foregoing description, the pressure compensator valve 20 operates to maintain substantially constant the pressure differential across the inlet port 32 and control ports 34 and 36 of the control valve 14. This holds true regardless of the variable delivery of the pumps 16 and 18, the variable fluid pressure at the hoist cylinder port 72, and the variable fluid pressure at the control ports 34 and 36.

What follows is the operational description of the control valve 14. If its control spool 28 is of the closed center configuration 52, the pair of steering cylinder ports 38 and 40 are discommunicated from all of the inlet port 32, the control ports 34 and 36, and the reservoir ports 42 and 44 when the control spool is in the illustrated neutral position. Only the control ports 34 and 36 communicate with the reservoir port 44 by way of the passages 56, 58 and 60 in the control spool 28.

If the control spool 28 has the configuration 54 for ABR port connection, on the other hand, the control spool when in neutral holds the steering cylinder ports 38 and 40 in direct communication with the control port 34 and the reservoir port 42 and with the control port 36 and the reservoir port 44, respectively. Both steering cylinder ports 38 and 40 are out of communication with the inlet port 32.

Thus, irrespective of its two possible geometries 52 and 54, the control spool 28 when in neutral holds the control ports 34 and 36 in communication with the reservoir ports 42 and 44, or at least with the reservoir port 44. This means that no fluid pressure is delivered from the control port 36 to the left hand fluid chamber 82 of the pressure compensator valve 20 when the control valve 14 is not actuated. Consequently the fluid pressure at the control valve inlet port 32 decreases, as will be evident from the foregoing operational description of the pressure compensator valve 20. The fluid pressure developed by the two pumps 16 and 18 can therefore be utilized solely for driving the implement hoist cylinder 12.

It will further be seen that, regardless of the particular configuration 52 or 54 adopted, the control spool 28 places the control ports 34 and 36 out of communication with the reservoir ports 42 and 44 when actuated in either direction. This is necessary for the proper pressure-sensitive operation of the pressure compensator valve 20. The relief valve means 22 act to permit escape of excessive pressure that may build up in the control ports 34 and 36 when the latter are discommunicated from the reservoir ports 42 and 44.

When actuated to the right against the force of the centering spring 48, the control spool 28 of both configurations 52 and 54 establishes communication between inlet port 32 and control port 34. The control spool 28 of the closed center configuration 52, moreover, permits communication between control port 36 and steering cylinder port 40 and blocks communication between control port 36 and reservoir port 44. The control spool of the ABR configuration 54, on the other hand, further blocks communications between control port 34 and steering cylinder port 38 and between steering cylinder port 40 and reservoir port 44.

Either way, therefore, the pressurized fluid delivered from the pressure compensator valve outlet port 70 to the control valve inlet port 32 flows into the control port 34 and thence into the steering cylinder port 40 by way of the other control port 36. The outgoing pressurized fluid activates the unshown steering cylinder in one predetermined direction.

The pressure compensator valve 20 operates as aforesaid to maintain substantially constant the pressure drop across the inlet port 32 and control port 34 of the control valve 14. Only the cross-sectional area of the path from the inlet port 32 to the control port 34, therefore, determines the flow rate of the pressurized fluid traveling therethrough. This flow rate is totally independent of the delivery of the pumps 16 and 18, the load on the implement hoist cylinder 12, and the load on the steering cylinder.

The cross-sectional area of the fluid path from the inlet port 32 to the control port 34 or 36 may therefore be appropriately correlated with the displacement of the control spool 28 in either direction from its neutral position. With this correlation established, the pressure-compensated directional control valve 10 according to the invention will overcome such conventional problems as delay in steering response at low engine speed and hunting at high engine speed or under high load conditions.

The steering actuator port 38 is in communication with the reservoir port 42 when the control spool 28 of both configurations 52 and 54 is shifted to the right as above. These ports 38 and 42 provide a drain passage for the fluid from the steering cylinder back to the reservoir 24.

When actuated to the left against the effect of the centering spring 48, the control spool 28 of both configurations 52 and 54 establishes communication between inlet port 32 and control port 36. If of the closed center configuration 52, moreover, the control spool 28 permits communications between control port 34 and steering cylinder port 38 and between steering cylinder port 40 and reservoir port 44. The control spool of the ABR configuration 54, on the other hand, further blocks communications between control port 36 and steering cylinder port 40 and between steering cylinder port 38 and reservoir port 42.

The pressurized fluid from the pressure compensator valve outlet port 70 is therefore directed into the steering cylinder port 38 by way of the control valve inlet port 32, the control port 36, and the control port 34. The cross-sectional area of the path from the inlet port 32 to the control port 36 determines the flow rate of the fluid thus admitted into the steering cylinder port 38. The outgoing pressurized fluid activates the steering cylinder in the other of the opposite directions. The fluid drained from the steering cylinder returns to the reservoir 24 by way of the steering cylinder port 40 and reservoir port 44.

While one embodiment of this invention has been shown and described herein, it will be understood that it is illustrative only and not to be taken as a definition of the scope of the invention, reference being had for this purpose to the appended claims.

What is claimed is:

1. A pressure-compensated directional control valve assembly for use with a first and a second pump, comprising:
 (a) a housing having formed therein;
  (1) a first bore;
  (2) an inlet port communicating with the first bore;
  (3) a pair of control ports in constant communication with each other and further communicating with the first bore;
  (4) a pair of actuator ports communicating with the first bore; and
  (5) a pair of reservoir ports communicating with the first bore;
 (b) a control spool reciprocably mounted in the first bore and operative in a neutral position to block communications between the inlet port and the others of the above recited ports and to permit communication between the control ports and at least one of the reservoir ports, the control spool being operative upon movement from the neutral position to establish communication between the inlet port and one of the actuator ports by way of the control ports;
 (c) the housing having further formed therein:
  (1) a second bore;

(2) a first pump port for receiving pressurized fluid from the first pump, the first pump port communicating with the second bore;

(3) a second pump port for receiving pressurized fluid from the second pump, the second pump port communicating with the second bore;

(4) a first outlet port in constant communication with the inlet port and further communicating with the second bore; and (5) a second outlet port communicating with the second bore;

(d) pressure compensator spool means reciprocably mounted in the second bore and operative in a normal position to place the first and the second pump ports in communication with the first outlet port and out of communication with the second outlet port, the pressure compensator spool means being operative upon movement in a predetermined direction from the normal position to place the first pump port in communication with the second outlet port and then to place the second pump port in communication with the second outlet port; the pressure compensator spool means including:

(1) a first land for normally blocking communication between the first pump port and the second outlet port;

(2) a second land for normally blocking communication between the second pump port and the second outlet port; and (3) a third land for constricting a fluid path from the second pump port to the first outlet port upon movement of the pressure compensator spool in the predetermined direction from the normal position and after the establishment of communication between the second pump port and the second outlet port;

(e) means for providing the communication between the first pump port and the first outlet port when in the normal position, said means including a check valve opened by the pressurized fluid delivered from the first pump when the pressure compensator spool is in the normal position;

(f) resilient means for normally holding the pressure compensator spool means in the normal position; and (g) means defining a first and a second fluid chamber at opposite ends of the pressure compensator spool means, the first fluid chamber communicating with the control ports for forcing the pressure compensator spool means in a direction opposite to the predetermined direction under fluid pressure supplied from the control ports, the second fluid chamber communicating with the first outlet port for forcing the pressure compensator spool means in the predetermined direction under fluid pressure supplied from the first outlet port;

(h) whereby the pressure compensator spool means travels in the predetermined direction from the normal position when the resultant of the force of the resilient means and the fluid pressure in the first fluid chamber is overcome by the fluid pressure in the second fluid chamber.

2. A pressure-compensated directional control valve assembly according to claim 1, wherein the control spool is of such configuration that when in the neutral position, the control spool closes all of the inlet port, the control ports, the actuator ports, and the reservoir ports, and wherein the control spool has formed therein a passage for providing the communication between the control ports and one of the reservoir ports when the control spool is in the neutral position.

3. A pressure-compensated directional control valve assembly according to claim 1, wherein the control spool is of such configuration that when in the neutral position, the control spool closes the inlet port and permits communications between the control ports, the actuator ports, and the reservoir ports.

4. A pressure-compensated directional control valve assembly according to claim 1, further comprising:
(a) a fluid-operated actuator; and
(b) a directional control valve for selectively communicating the second outlet port with the fluid-operated actuator and with a fluid drain.

5. A pressure-compensated directional control valve assembly according to claim 1 wherein said means for providing the communication is a passage axially formed in the pressure compensator spool.

* * * * *